United States Patent [19]

Moon

[11] Patent Number: 4,581,838
[45] Date of Patent: Apr. 15, 1986

[54] FISHING ROD HOLDER

[76] Inventor: Young H. Moon, 1600 Ontarioville Rd., Apt. 204 B, Hanover Park, Ill. 60103

[21] Appl. No.: 631,535

[22] Filed: Jul. 16, 1984

[51] Int. Cl.⁴ .................... A01K 97/10; A01K 97/12
[52] U.S. Cl. ........................................ 43/17; 248/533; 43/21.2
[58] Field of Search ............... 43/21.2, 17; 248/520, 248/525, 528, 529, 530, 533, 534; D22/22

[56] References Cited

U.S. PATENT DOCUMENTS

| D. 221,279 | 7/1971 | Erickson | 43/21.2 |
|---|---|---|---|
| 1,131,508 | 3/1915 | Hall | 43/17 |
| 2,601,839 | 7/1952 | Kucewicz | 43/17 |
| 2,641,079 | 6/1953 | Oster | 43/17 |
| 2,856,144 | 10/1958 | Plater | 248/533 |
| 2,921,399 | 1/1960 | Huliew | 43/17 |
| 3,543,432 | 4/1969 | Gates | 43/21.2 |

FOREIGN PATENT DOCUMENTS

| 15441 | of 1843 | United Kingdom | 248/533 |
|---|---|---|---|
| 905175 | 9/1962 | United Kingdom | 43/21.2 |
| 2015851 | 9/1979 | United Kingdom | 43/21.2 |

Primary Examiner—Nicholas P. Godici
Assistant Examiner—C. McKee
Attorney, Agent, or Firm—Lloyd L. Zickert

[57] ABSTRACT

A ground mountable fishing rod holder comprising an elongate stake member having a lower portion thereof insertable into the ground and an upper portion receiving a fishing rod. A ground brace member pivotally engages the stake member at one side thereof and a rod support member slidably and pivotally engages the stake member at the opposite side and coacts with the upper portion of the stake member to support a fishing rod in an upright fishing position. Said ground support and rod support members are thereby foldable against opposite sides of the stake member whereby to permit the fishing rod holder to be collapsed to a relatively flattened arrangement for storage.

14 Claims, 5 Drawing Figures

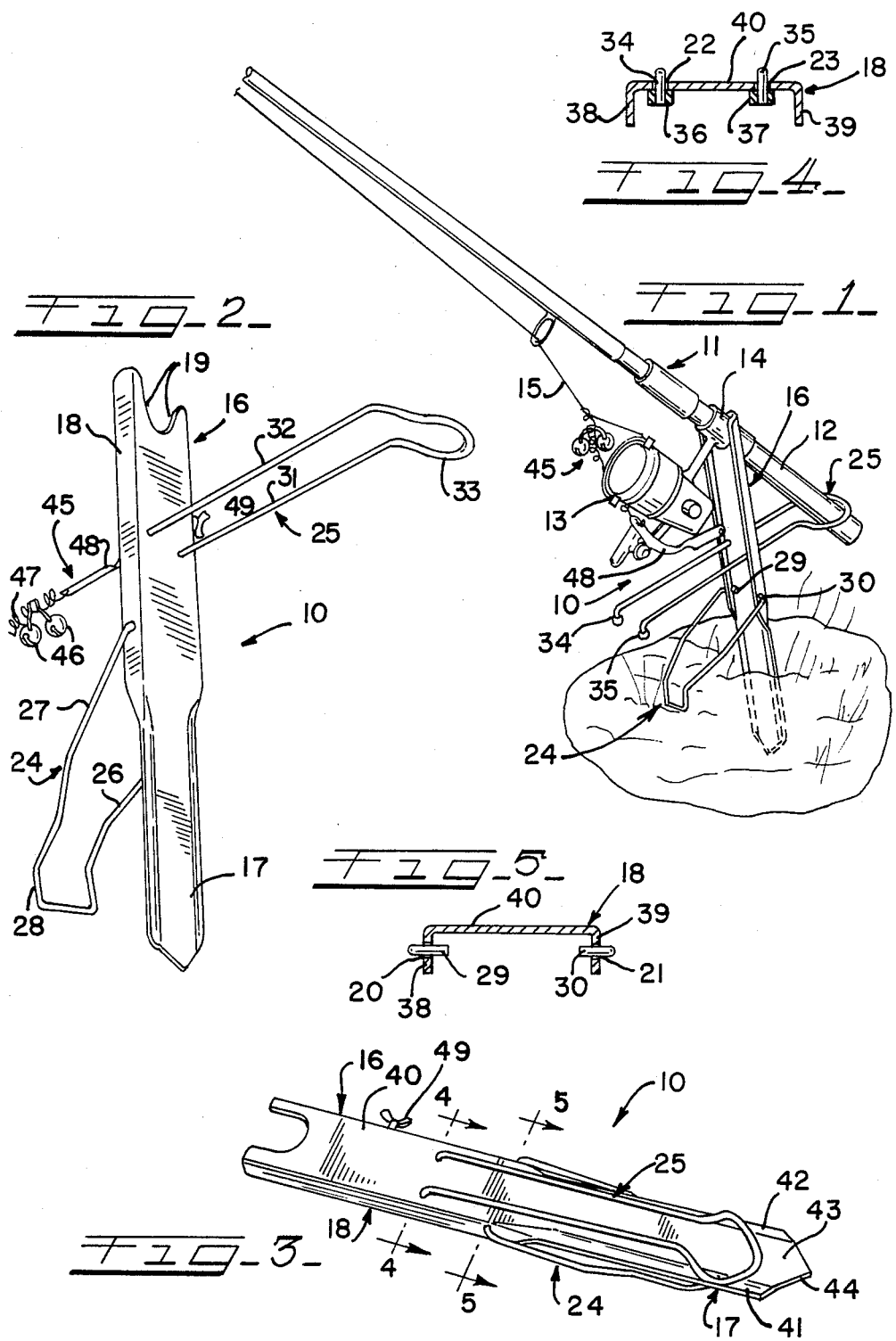

FISHING ROD HOLDER

BACKGROUND AND SUMMARY OF THE INVENTION

The invention is related to a device for holding a fishing rod which can be inserted into the ground along the shoreline.

Various prior art fishing rod supports have utilized bent metal wire which include a rod holding portion and depending wire prongs for inserting into the ground. Certain of these wire-type devices also include twin-looped wire sections for supporting the reel as well as the rod.

Typically fishing rod holders of this kind have provided curved wire portions which are configured to provide a bale-like loop for holding the end of the rod, and forwardly thereof, a second curved portion for holding the rod at a point therealong adjacent the reel. Thus, the spacing between the two holding means is fixed and unadjustable.

Some other prior art holders have an upper alarm system in conjunction with the rod holder for making a noise when the rod is moved by a biting fish. These kinds of devices generally provide a depending pole-like member for insertion into the ground, or provide vise-like appurtenances for attachment to the side of a boat, bridge railing, tackle box, etc.

A few previous rod holders have included a sheet metal section with a groove cut at the top of the member which receives a portion of the fishing rod. A bale has been pivotally affixed to these sheet metal type devices rearwardly of the slot for engagement over the rod handle generally near its end. This type of holder limits the movement of the bale to rotation about the pivotal connection.

Some known rod holders of the wire-type have provided a pivoting ground support section which folds onto a bent wire rod-holding portion for storage. However, with these devices, the ground support is simply a single earth-penetrating section which can be quite unstable and may require that the section be driven deeply into the ground to assure a firm foundation.

A problem with so-called collapsible wire-type devices is that the upper rod holding sections do not cooperate with the folding ground support to offer a flattened, easily stored device.

Rod holders having fish-strike alarm systems are inherently not collapsible for storage, particulary those of the battery-operated variety, and are usually more elaborately designed than required for the task at hand.

The bales of certain holding devices, which can be mounted to tackle boxes, generally are foldable against a sheet metal member, but these devices are unsuited for ground insertion and do not provide any ground bracing even if tried for such use.

A common problem with previously known rod supports is that the adjustability of the rod retaining members is limited. It would be highly desirable to provide a sturdy, elongate member which movably retains a rod support member relative to an upper rod-receiving notch formed on the elongate member. Thereby, a variety of inclinations for a fishing rod can be obtained as might be needed by the individual. Additionally, fishing rods and reels of various sizes should also be supportable by such a device.

Prior art devices which provide for insertion into the ground have failed to offer adequate bracing for the device. It would be advantageous to provide a cooperative ground brace in conjunction with a penetrable member whereby a solid two point stance can be attained. This feature would be additionally beneficial if the ground brace were movable relative to the ground insertion member so that a fishing rod could be held in a variety of inclinations relative to a fishing site.

It would also be desirable for the fishing rod holder to be collapsible to a generally flat condition for storage. Thus, it would be preferred to arrange both an adjustable fishing rod support member and an adjustable ground brace member to be pivotably associated with an elongate stake member, whereby the device may be quickly collapsed to a relatively flattened condition.

It would also be advantageous to provide a mechanical noisemaker which is foldably cooperative with the stake member. Moreover, the mechanical noisemaker would be of great benefit if it were adjustable for use with differently sized fishing rods and capable of use for the numberous dispositions in which the fishing rod might be held.

It would be a significant achievement to provide a rod holder which satisfies all these goals and is also lightweight, sturdy, and does not need to be disassembled to attain the collapsed storable arrangement. It would be concomitantly helpful to utilize strong bent metal rods for both the rod support and ground brace members that are adjustably cooperative with an elongate stake member, and which cannot be inadvertently disengaged from the member.

The present invention solves these problems found in the prior art and provides a great improvement for ground-insertable fishing rod holders.

In brief summary, the invention may be described as comprising an elongate stake member having a ground insertable portion at one end and, at the opposite upper end, a notch which opens upwardly for receiving a fishing rod. The stake member further includes first and second retaining or engagement means for movably and adjustably retaining a fishing rod support member and ground brace member. The support and ground brace members comprise sturdy bent metal rod sections. The rod support member is retained by one of the engagement means whereby to be adjustable relative to the upwardly open notch. The rod support member includes a bale-type looped end and two extending arms which are slidable through the elongate stake member at said engagement means. The extending arms have pivoting free ends whereby to render the support member collapsible against one side of the stake member. The ground brace member is bent into a generally U-shape and has a bottom ground-contacting foot section between two legs extending upwardly therefrom and pivotally engaged at the other engagement means. The ground brace member is pivotable to be collapsed against the opposite side of the stake member for storage. A mechanical noisemaker is optionally provided which is releasably held at the upper portion of the stake member at a location whereby to be releasably engaged along a supported fishing rod. The disclosed fishing rod holder is a significant advancement in the art and provides very stable support for various terrain. Additionally, a supported fishing rod may be oriented in numerous positions, and the device is capable of holding a variety of different kinds of fishing rods and reels.

BRIEF DESCRIPTION OF THE DRAWINGS

The details of the invention, and the improvements provided, will best be understood by reference to the accompanying drawings of the preferred embodiment thereof, wherein like reference numerals refer to the same elements throughout, as will be hereinafter described, wherein:

FIG. 1 is a perspective view of the fishing rod holder inserted into the ground and supporting a fishing rod;

FIG. 2 is a perspective view of the fishing rod holder viewed from the backside thereof;

FIG. 3 is a perspective view of the fishing rod holder looking downwardly thereon and wherein the holder is in a collapsed condition for storage;

FIG. 4 is a cross-sectional view of the fishing rod holder taken along line 4—4 of FIG. 3; and, FIG. 5 is an another cross-sectional view of the fishing rod holder taken along line 5—5 of FIG. 3.

DESCRIPTION OF THE PREFERRED EMBODIMENT

Throughout the Figures, the fishing rod holder is designated by the numerical reference 10. Holder 10 is shown supporting a fishing rod 11 having a handle 12 and a fishing reel 13 mounted to the rod at a conventional attachment 14. Fishing line 15 extends outwardly from the reel in the usual manner.

As is clear from FIG. 1, holder 10 is insertable into the ground and provides for the forward inclination of rod 11 toward a pond or the like. Thus, fishing can be conducted without the need to continuously hold the fishing rod. The fishing rod 11 is securely retained but can easily be lifted from holder 10 in a simple upward and forward motion as would be clear. Holder 10 is characterized by its sturdiness and ability to adjustably accommodate variously sized fishing rods and reels in a construction that is also fully collapsible for storage.

With particular reference to FIGS. 1 and 2, holder 10 includes an elongate stake member 16 having a lower portion 17 which is ground insertable. An upper portion 18 is integrally formed with lower portion 17 and has an upper notch 19 for receiving the handle 12 of the fishing rod 11.

Stake member 16 is preferably formed of thick gauge aluminum which is strong and rust resistant. The stake member 16 includes first and second engagement means cooperating with a rod support member and a ground brace member as will be hereinafter described. The first engagement means is provided by apertures 20 and 21, best viewed in FIG. 5. The second engagement means is provided at apertures 22 and 23, as best shown in FIG. 4.

A ground brace, or support, member 24 engages the first engagement means and takes the form of a generally U-shaped length of metal rod but to be provided with extending legs 26 and 27. The legs are conjoined by a re-bent connecting foot section 28 which is the base of the brace, as best shown in FIG. 1. Legs 26 and 27 respectively terminate in opposing inwardly bent ends 29 and 30 which engage within apertures 20 and 21 in a pivoting relationship. Thereby, the brace is foldable against stake member 16. By means of brace 24, holder 10 can be inserted into the ground at various angles and the brace 24 rotated to rest foot section 28 on the ground. Additionally, because of brace 24, the lower portion 17 need not be relied upon as the sole support. Accordingly, a very stable support structure is created.

A rod support member 25 cooperates with the upper notch 19 of stake member 16 for holding a fishing rod. As with the brace 24, rod support 25 is preferably a bent length of metal rod and is formed whereby to create spaced-apart arms 31 and 32 that are generally straight sections. The arms 31 and 32 are conjoined at a bight portion to form a bale 33 for holding the lower end of a fishing pole, as shown in FIG. 1. The bale 33 is re-bent slightly out of the plane of arms 31 and 32 in a direction toward the lower portion of the stake member whereby to be capable of retaining handle 12 in a lever-like relationship with notch 19. In this manner, the weight of the rod, forward of notch 11, pivots the rod downwardly and notch 19 becomes the fulcrum so that handle 12 is moved upwardly to supportively contact bale 33.

Apertures 22 and 23 are slidably engaged by arms 31 and 32. Arms 31 and 32 terminate in bent free ends 34 and 35, as illustrated in FIG. 4. Sufficient tolerance is provided between the apertures and the bent ends to allow for the pivoting, and hence foldability, of rod support 25 when the arms 31 and 32 are pulled outwardly of apertures 22 and 23 to dispose the ends 34 and 35 in the apertures.

It will thus be apparent that by sliding arms 31 and 32 inwardly or outwardly of apertures 22 and 23, the spacing between notch 19 and bale 33 may be varied to accommodate the shape and size of the particular fising rod used.

Preferably, support member 25 is designed to be firmly detained within the apertures, at any selected position of arms 31 and 32, so that the arms will not inadvertently slip and result in the accidental release of a fishing rod. Therefore, the preferred embodiment for member 25 includes arms 31 and 32 manufactured to be spring biased while arranged within apertures 22 and 23. Specifically, the arms are made to have free ends 34 and 35 spaced-apart at a greater distance than the spacing of the apertures, and greater than the spacing of the arms adjacent bale 33. During assembly, the arms are squeezed together to enable the free ends to be inserted through the apertures. When inserted, the arms are resiliently released to move away from each other and, as a result, frictionally engage the apertures whereby member 25 is firmly detainable at any desired position relative to stake member 16.

To re-position member 25, the individual simply squeezes the arms slightly toward each other and then slides the arms inwardly or outwardly of stake member 16 to the new disposition required. At the appropriate orientation for the accommodation of a specific fishing rod, the individual then releases arms 31 and 32 and they tend to spread apart and again become biased against the outward edges of the apertures to firmly detain member 25 at the new position.

It is also preferable that arms 31 and 32 are not inadvertently disengageable from stake member 16. For this reason, the illustrative embodiment includes end stops 36 and 37 in the form of circular collars fixed around free ends 34 and 35, as shown in FIG. 4. Thereby, the arms cannot be removed from engagement within the apertures.

In the exemplary embodiment, upper portion 18 is a generally shallow U-shaped channel having short side walls 38 and 39 joined by a transverse wider back wall 40. The apertures 22 and 23 are formed through back wall 40 below notch 19. Apertures 20 and 21 are coaxial and extend through side walls 38 and 39 below apertures 22 and 23. Bent ends 29 and 30 of brace member 24 are sized to snugly, but rotatably, fit within apertures 20 and 21 whereby to be pivotable for folding member 24 against stake member 16. It will be noted that foot section 28 is bent toward lower portion 17. This conformation provides a generally vertical supporting structure adjacent the ground for the most likely envisioned orientation of stake member 16, which is at about right angles to the ground surface. Also, the brace member 24 is thereby rendered stronger by being more resistant to bending forces.

Stake member 16 is specifically formed whereby upward portion 18 smoothly transitions to form lower portion 17. With reference to FIG. 3, it will be seen that lower portion 17 includes side flanges 41 and 42 which extend outwardly from a wider back wall 43. Flanges 41 and 42 form slight angles with back wall 43 to create a generally shallow channel having a depth less than the U-shape upper portion 18. Flanges 41 and 42 transition to the side walls 38 and 39 of U-shaped upper portion 18. At the end of lower portion 17, the flanges 41 and 42, and back wall 43, are tapered to provide a pointed end 44. Lower portion 17 is best described as having a shape similar to a garden shovel. The pointed end aids in the penetration of the earth to enable holder 10 to be readily inserted.

To provide a relatively flat collapsed arrangement, it will be observed that the configuration of lower portion 17 allows for the flush accommodation of brace member 24 upon folding it thereagainst. In this relationship, the major portion of brace member 24 generally nestles within the shallow channel-shape of lower portion 17, and upper portions of arms 26 and 27 rest along the outer surfaces of said walls 38 and 39. The rod support member 25 is designed to be pulled outwardly of stake member 16 and pivoted at free ends 34 and 35, so that arms 31 and 32, and bale 33, will lie flushly against the generally planar surface of back walls 40 and 43, as illustrated in FIG. 3.

An optional feature of the invention is the provision of a mechanical noisemaker 45. Mechanical noisemaker 45 is retained along the upper portion 18 of stake member 16 and comprises a pair of bells 46 held on a helical spring 47. Spring 47 is attached to a flexible strip of metal 48 whereby the bells are easily shaken. Metal strip 48 is releasably mounted to one of the side walls 38 and 39, such as by means of an adjustable wing nut fastener 49. Thus, with reference to FIG. 1, it will be understood that noisemaker 45 may be adjusted as needed to place spring 47 around fishing line 15, or alternatively, around the shank of fishing rod 11. Upon hooking a fish, the resultant movement of line 15 will in turn rapidly shake bells 46 to alert the individual that a strike has been made. Noisemaker 45 is also made collapsible by the provision of fastener 49, whereby it can be folded to reside inside the channel of the U-shaped upper portion 18.

The novel ground engaging fishing rod holder disclosed offers significant advancements in the art. A wide variety of dispositions of a particular fishing rod can be achieved by means of the adjustability of the ground brace member 24 and rod support member 25. This feature also allows for the accommodation of differently sized fishing rods and reels. When fishing has been completed, the fisherman simply folds down the brace and rod support members to lie flatly against opposite sides of stake member 16.

Optionally, noisemaker 45 may be provided, which is collapsible against the interior of the upper portion 18 to achieve the relatively flat configuration shown in FIG. 3. No detachment of any members is required and all the foregoing advantages are provided in addition to sturdiness and durability.

What is claimed is:

1. A fishing rod holder comprising a stake member having a ground insertable lower portion and an upper portion terminating in an upwardly open notch means for receiving a fishing rod, said upper portion being in the form of a U-shaped channel having a back wall and a pair of side walls extending at right angles therefrom, a ground support member pivotably engaged at said side walls which define a first engagement means and extendable towards the fishing area when in use and a rod support member movably engaged at said back wall which defines a second engagement means and extendable away from the fishing area when in use, whereby said ground support and rod support members are capable of being folded against said stake member.

2. A fishing rod holder as in claim 1 wherein the ground support and rod support members are foldable against opposite sides of the stake member.

3. A fishing rod holder as in claim 1 wherein said second engagement means further includes a pair of apertures through said stake member.

4. A fishing rod holder as in claim 3 wherein said rod support member comprises a length of metal rod bent so as to be formed to have two spaced-apart generally straight arm portions joined at a loop-shaped bale, said arm portions movably engaging said pair of apertures in slidable relationship therewith, and said bale capable of receiving a fishing rod therethrough, wherein the bale is capable of being arranged at various distances from said notch means.

5. A fishing rod holder as in claim 4 wherein said arm portions terminate in free ends, said free ends and bale residing at opposite sides of the stake member.

6. A fishing rod holder as in claim 5 wherein said free ends are re-bent to facilitate pivoting said rod support member at said apertures.

7. A fishing rod holder as in claim 6 wherein said free ends include stop means whereby to prevent said arms from disengaging said apertures.

8. A fishing rod holder as in claim 1 wherein said second engagement means are disposed along said stake member between said notch means and first engagement means.

9. A fishing rod holder as in claim 1 wherein said ground support member comprises a length of metal rod bent so to be formed to have two spaced-apart leg portions engaging said first engagement means at free ends thereof, said leg portions extending from said free ends to be joined at a connecting section of said rod forming a foot portion for said ground support, wherein said foot portion is adapted to supportively contact the ground upon the insertion of the lower portion of the sake member therein.

10. A fishing rod holder as in claim 9 wherein said free ends pivotally engage said first engagement means whereby the angle between the ground support member and stake member may be varied to enable the stake member to be arranged at various angles of insertion into the ground and facilitate pivoting said support member to rest said foot portion on the ground.

11. A fishing rod holder as in claim 1 which further includes noisemaker means mounted on said stake member and being capable of making sounds when moved and adapted to be releasably attached to a fishing rod or line, whereby upon movement of the fishing rod said noisemaker responsively moves to make sounds.

12. A fishing rod holder as in claim 11 wherein the noisemaker means is pivotally supported on said stake member and to be foldable thereagainst.

13. A fishing rod holder for insertion into the ground comprising an elongate stake member having a lower pointed end and an upper end opposite thereto having an upwardly open rod-receiving notch means, said upper end being in the form of a U-shaped channel having a back wall and a pair of side walls extending at right angles therefrom, a ground support member pivotably engaging said side walls and capable of folding against said stake member at one side thereof, said ground support member extending toward the fishing area when in use, a rod support member slidably and pivotally engaging the back walls, said rod support member including arms joined at rod-holding bale means and extending away from the fishing area when in use, wherein the arms are movable relative to the stake member to enable the bale means to be adjustably positioned relative to said notch means, said arms terminating in pivotable free ends whereby the rod support member is foldable against the stake member at a side thereof opposite the ground support member.

14. A fishing rod holder comprising a stake member having a ground insertable lower portion and an upper portion terminating in an upwardly open notch means for receiving a fishing rod, said upper portion further having first and second engagement means, a ground support member pivotably engaged at said first engagement means and a rod support member movably engaged at said second engagement means, said stake member upper portion being a U-shaped channel having a back wall and a pair of side walls extending at generally right angles therefrom, said upper portion transitioning to said lower portion and said lower portion having a back wall and side flanges extending outwardly therefrom at less than 90° thereto, and wherein said lower portion has a generally shallow channel shape of a depth less than the U-shaped upper portion, whereby said ground support and rod support members are capable of being folded against said stake member.

* * * * *